(12) United States Patent
Nakatsu

(10) Patent No.: US 7,570,747 B2
(45) Date of Patent: Aug. 4, 2009

(54) PRIVATE BRANCH EXCHANGE (PBX), VOICE STORE EQUIPMENT, MESSAGE PROCESSING METHOD, PROGRAM AND RECORDING MEDIUM

(75) Inventor: Makoto Nakatsu, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1087 days.

(21) Appl. No.: 10/831,275

(22) Filed: Apr. 26, 2004

(65) Prior Publication Data

US 2004/0247096 A1    Dec. 9, 2004

(30) Foreign Application Priority Data

Apr. 24, 2003  (JP)  .............................. 2003-120005
Feb. 6, 2004   (JP)  .............................. 2004-030340

(51) Int. Cl.
    *H04M 1/64*    (2006.01)
(52) U.S. Cl. ...................... 379/88.25; 379/70; 379/198; 379/88.23
(58) Field of Classification Search .............. 379/88.13, 379/88.18, 93.05, 165
    See application file for complete search history.

(56) References Cited

U.S. PATENT DOCUMENTS

| 6,633,631 | B2 * | 10/2003 | Tanaka et al. | ............... | 379/165 |
| 6,681,001 | B1 * | 1/2004 | Clayton et al. | ........... | 379/93.05 |
| 6,751,299 | B1 * | 6/2004 | Brown et al. | ............. | 379/88.18 |
| 6,782,079 | B2 * | 8/2004 | Skladman et al. | ........ | 379/88.13 |
| 6,868,144 | B2 * | 3/2005 | Skladman et al. | ........ | 379/88.13 |

FOREIGN PATENT DOCUMENTS

| JP | 04-020160 | 1/1992 |
| JP | 5110679 | 4/1993 |
| JP | 5316225 | 11/1993 |
| JP | 09-271052 | 10/1997 |
| JP | 11-164025 | 6/1999 |
| JP | 2000-354111 | 12/2000 |
| JP | 2001-333190 | 11/2001 |

OTHER PUBLICATIONS

Japanese Office Action dated Feb. 3, 2009 with English translation.

* cited by examiner

*Primary Examiner*—Ahmad F. Matar
*Assistant Examiner*—Antim Shah
(74) *Attorney, Agent, or Firm*—Dickinson Wright, PLLC

(57) ABSTRACT

A PBX which accommodates an extension station and voice store equipment, the PBX comprising a controller for controlling interconnection between the extension or the voice store equipment and an outside line, the controller including: a destination extension number determination unit for determining the destination extension number for an incoming call from the outside line; a destination extension determination unit for determining whether the destination extension is the extension station or the voice store equipment based on the determined destination extension number; a voice store equipment termination processing unit for performing termination processing concerning the voice store equipment in case it is determined on the destination extension determination means that the destination extension is the voice store equipment; and an extension station termination processing unit for performing termination processing concerning the extension station in case it is determined on the destination extension determination unit that the destination extension is the extension station.

5 Claims, 13 Drawing Sheets

FIG. 8

| NUMBER | MESSAGE CONTENTS | |
|---|---|---|
| 01 | Go Home | "THIS IS XX. I HAVE ALREADY LEFT FOR HOME. PLEASE RECORD YOUR MESSAGE." |
| 02 | In Meeting | "THIS IS XX. I AM ON MEETING NOW. PLEASE RECORD YOUR MESSAGE." |
| 03 | Back at %%:%% | "THIS IS XX. I WILL BE BACK AT %%:%%. PLEASE RECORD YOUR MESSAGE." |
| 04 | | |
| 05 | | |
| 06 | | |
| 07 | | |
| 08 | | |
| 09 | | |
| 10 | Lunch Time | "THIS IS XX. I AM OUT FOR LUNCH NOW. PLEASE RECORD YOUR MESSAGE." |

PRIVATE BRANCH EXCHANGE (PBX), VOICE STORE EQUIPMENT, MESSAGE PROCESSING METHOD, PROGRAM AND RECORDING MEDIUM

BACKGROUND OF THE INVENTION

The present invention relates to a private branch exchange (PBX) which connects to voice store equipment and supplies a message to an outside line, voice store equipment connected to the PBX, a message processing method in the PBX and the voice store equipment, a program for executing the processing method and a recording medium on which the program is recorded.

FIG. 15 is an operation explanatory drawing of the operation of in related art PBX and voice store equipment.

In FIG. 15, a numeral 1 represents a PBX which controls interconnection of its built-in voice store equipment 2 or extension station 3, 4 mentioned later and an outside line, and 2 voice store equipment which supplies a guidance message in response to an incoming call from the outside line.

Processing of an absence message in the PBX, extension station and voice store equipment thus configured is described below.

When the user of the extension station 3, 4 leaves his/her desk, he/she sets the reason for the absence on the extension station 3, 4. Contents of setting include text data such as "Go Home" and "In a Meeting" and text data plus numerical data such as "Back at %%: %%" (where %% is the time he/she will return) When an incoming call from another extension station terminates to an extension station where the reason for absence is set, for example when an incoming call from the extension station 3 terminates to the extension station 4, text data of the reason for absence set to the called extension station 3 is displayed on the LCD 31 of the calling extension station 4 while the bell is ringing.

FIG. 16 is a flowchart showing the related art absence message processing.

In FIG. 16, the PBX system determines whether the called extension (distant extension for example the extension station 4) is busy (S1). In case it is determined that the called extension is not busy, the PBX system determines whether an absence message to an extension is set (S2). In case it is determined that the absence message is set, the PBX system fetches the contents of the absentee message (S3) and displays them on the LCD 31 of the calling extension (home extension, for example the extension station 3) (S4). In case it is determined that the called extension is busy, a busy signal is transmitted from the called party to the calling party (S5). In case it is determined that the absence message to the extension is not set, the PBX system alerts the distant extension (S6).

In such a PBX system, in case a call from an outside line terminates to the voice store equipment 2 and the call is transferred to an extension station requested by the caller, for example the extension station 4, the voice store equipment 2 performs only the regular operation for the absence of the called party. For example, the voice store equipment supplies an OGM (personal greeting message) to the effect that "Sorry, cannot answer your call. Please record your message." and performs message recording.

In this way, related art PBX and voice store equipment has a problem that an absence message set to an extension station is not supplied in response to and incoming from an outside line, so the reason for absence is not known and the absence message is not efficiently utilized.

It is requested that the PBX, voice store equipment, message processing method, program and recording medium efficiently utilize an absence message set to an extension station by transmitting the message over an outside line in response to an incoming call via the outside line.

SUMMARY OF THE INVENTION

In order to satisfy the request, the invention aims at providing a PBX which can efficiently utilize an absence message set to an extension station in response to an incoming call via an outside line, voice store equipment which can efficiently utilize an absence message set to an extension station in response to an incoming call via an outside line, a message processing method which can efficiently utilize an absence message set to an extension station in response to an incoming call via an outside line, a program for executing the message processing method, and a recording medium on which the program is recorded.

In order to solve the problems, the invention provides a PBX which can accommodate an extension station and voice store equipment, the PBX comprising a controller for controlling interconnection between the extension or the voice store equipment and an outside line, characterized in that the controller comprises: destination extension number determination means for determining the destination extension number for an incoming call from the outside line; destination extension determination means for determining whether the destination extension is the extension station or the voice store equipment based on the determined destination extension number; voice store equipment termination processing means for performing termination processing concerning the voice store equipment in case it is determined on the destination extension determination means that the destination extension is the voice store equipment, the termination processing including processing concerning an absent message; and extension station termination processing means for performing termination processing concerning the extension station in case it is determined on the destination extension determination means that the destination extension is the extension station, the termination processing including processing concerning an absent message.

This provides a PBX which can efficiently utilize an absence message set to an extension station in response to an incoming call from an outside line.

In order to solve the problems, the invention provides voice store equipment which stores messages and guidance, the voice store equipment connectable to a PBX, characterized in that the voice store equipment comprises: incoming call detection determination means for determining whether an incoming signal from the PBX is received; incoming source determination means for determining whether the incoming source is an extension or an outside line in case the incoming call signal from the PBX is detected by the incoming call detection determination means; extension termination processing means for performing termination processing concerning an extension in case it is determined on the incoming source determination means that the incoming source is an extension, the termination processing including processing concerning an absent message; and outside line termination processing means for performing termination processing concerning an outside line in case it is determined on the incoming source determination means that the incoming source is an outside line, the termination processing including processing concerning an absent message.

This provides voice store equipment which can efficiently utilize an absence message set to an extension station in response to an incoming call from an outside line.

In order to solve the problems, the invention provides a message processing method for a PBX which can accommodate an extension station and voice store equipment, the PBX comprising a controller for controlling interconnection between the extension or the voice store equipment and an outside line, characterized in that the method comprises: a destination extension number determining step of determining the extension number of a destination of an incoming call from an outside line; a destination extension determining step of determining whether the destination extension is the extension station or the voice store equipment based on the determined destination extension number; a voice store equipment termination processing step of performing termination processing concerning the voice store equipment in case it is determined that the destination extension is the voice store equipment in the destination extension determining step, the termination processing including processing concerning an absent message; and an extension station termination processing step of performing termination processing concerning the extension station in case it is determined that the destination extension is the extension station in the destination extension determining step, the termination processing including processing concerning an absent message.

This provides a message processing method which can efficiently utilize an absence message set to an extension station in response to an incoming call from an outside line.

In order to solve the problems, the invention provides a program for executing the steps of the message processing method.

This provides a program for executing the message processing method.

In order to solve the problems, the invention provides a computer-readable recording medium on which the program is recorded.

This provides a recording medium on which the program is recorded.

BRIEF DESCRIPTION OF THE DRAWINGS

FIG. 8 is a data diagram showing the message contents and a voice message;

FIG. 16 is a flowchart showing the related art absence message processing.

DETAILED DESCRIPTION OF THE PREFERRED EMBODIMENTS

Embodiments of the invention are described referring to FIGS. 1 through 14.

Embodiment 1

Figure 1:
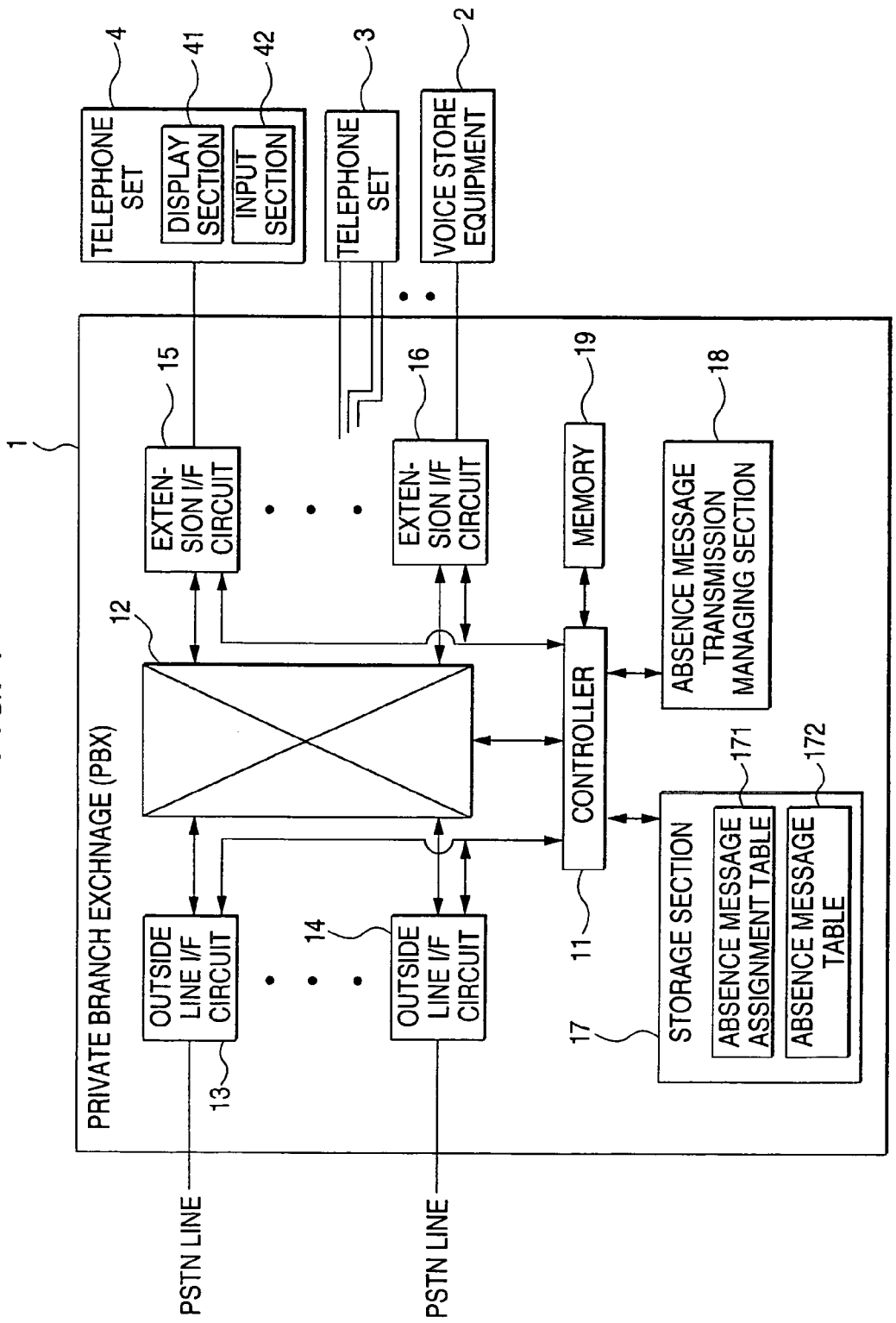
FIG. 1 is a block diagram showing a private branch exchange (PBX) system comprising a PBX according to Embodiment 1 of the invention.

FIG. 1 is a block diagram showing a private branch exchange (PBX) system comprising a PBX according to Embodiment 1 of the invention. In FIG. 1, a numeral 1 represents a PBX, 2 voice store equipment which stores messages and guidance and is connectable to the PBX 1, 3, 4 extension stations, 11 a controller for controlling interconnection between the extension 3, 4 or the voice store equipment 2 and an outside line, 12 a switch whose connection is controlled by the controller 11, 13, 14 outside line interface circuits (outside line I/F circuits) connected to outside lines (PSTN lines in this example).

Numerals 15, 16 represent extension interface circuits (extension I/F circuits) connected to an extension (extension station 3, 4 or voice store equipment 2). A numeral 17 represents a storage section comprising an absence message assignment table 171 for storing the assignment of an absence message and an absence message table 172 for storing an absence message, 18 an absence message transmission managing section for managing transmission of an absence message, 19 a memory, 41 a display section for displaying an absence message, and 42 an input section for inputting data such as an absence message. As shown in FIG. 1, each of the outside line interface circuit and an extension interface circuit comprises a plurality of circuits.

Figure 2:
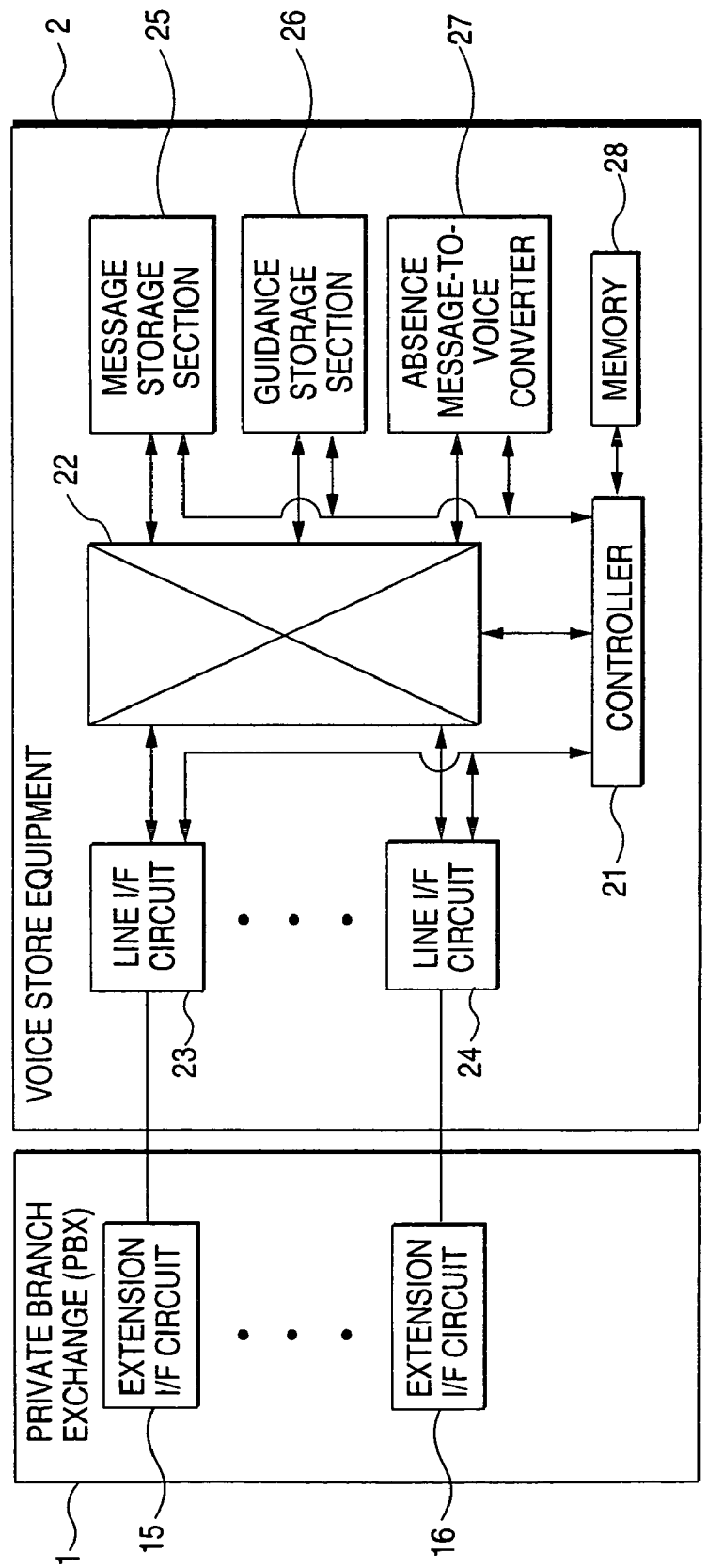
FIG. 2 is a block diagram showing the voice store equipment in FIG. 1.

FIG. 2 is a block diagram showing the voice store equipment 2 in FIG. 1. In FIG. 2, a numeral 1 represents voice store equipment similar to that in FIG. 1, 15, 16 extension interface circuits similar to those in FIG. 1, 21 a controller for controlling the entire voice store equipment 2, 22 a switch whose connection is controlled by the controller 21, 23, 24 line interface circuits (line I/F circuits) connected to the extension interface circuits 15, 16 of the PBX 1, 25 a message storage section for storing messages, 26 a guidance storage section for storing guidance, 27 an absence message-to-voice converter for converting an absence message received from an extension station via the PBX 1 to a voice message, and 28 a memory.

Figure 3:
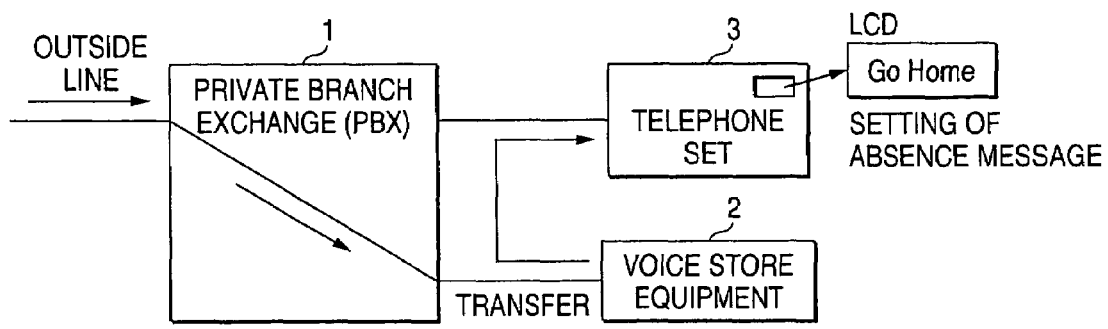
FIG. 3 is an explanatory drawing of the operation of termination of a call from an outside line to voice store equipment.
Figure 4:
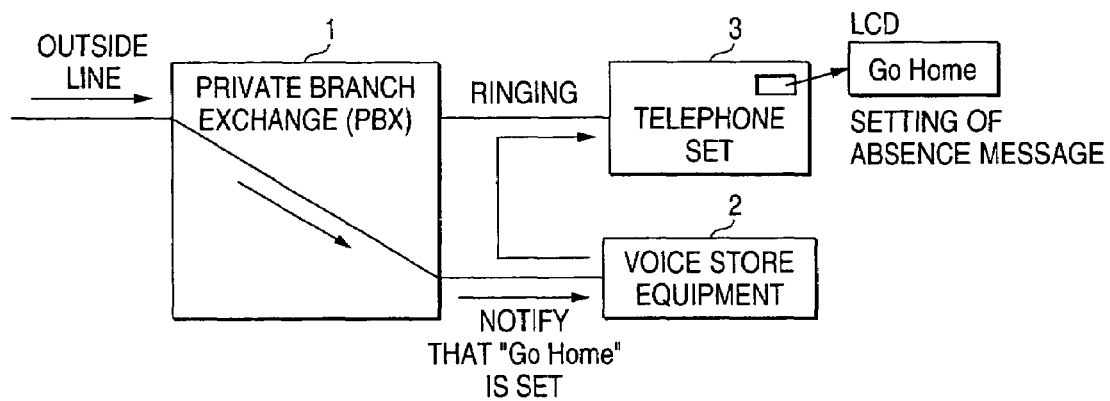
FIG. 4 is another explanatory drawing of the operation of termination of a call from an outside line to voice store equipment.
Figure 5:
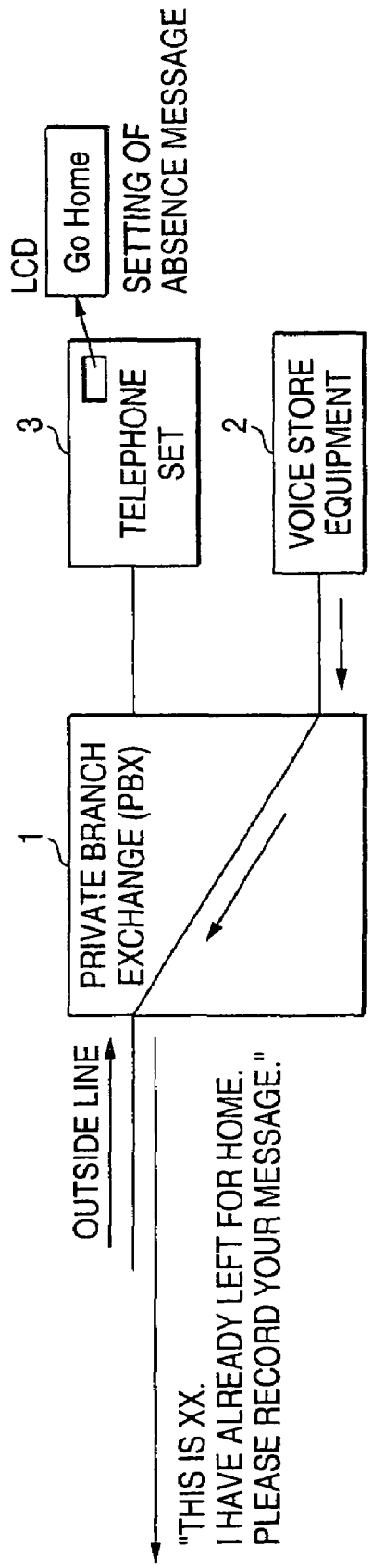
FIG. 5 is another explanatory drawing of the operation of termination of a call from an outside line to voice store equipment.
Figure 6:
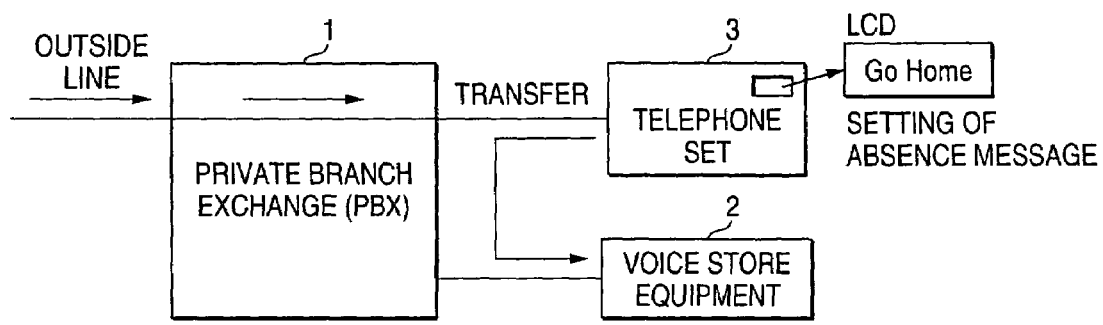
FIG. 6 is an explanatory drawing of the operation of termination of a call from an outside line to an extension.
Figure 7:
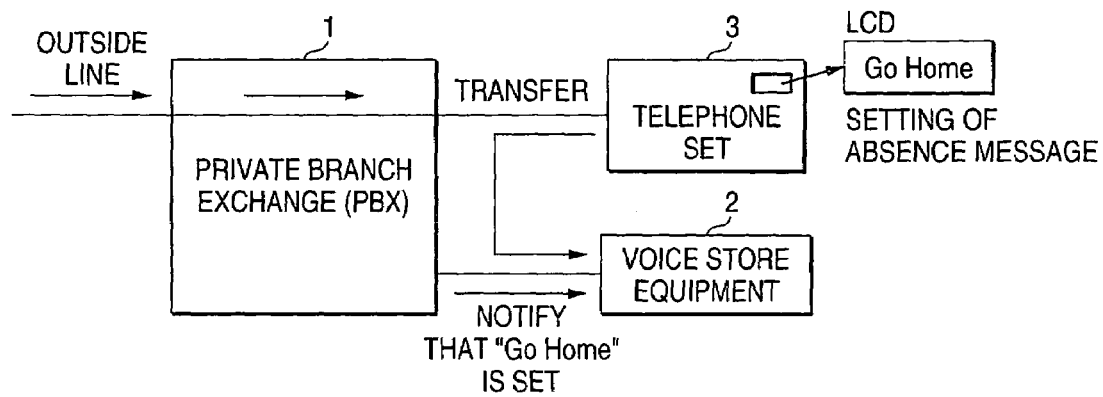
FIG. 7 is another explanatory drawing of the operation of termination of a call from an outside line to an extension.
Figure 9:
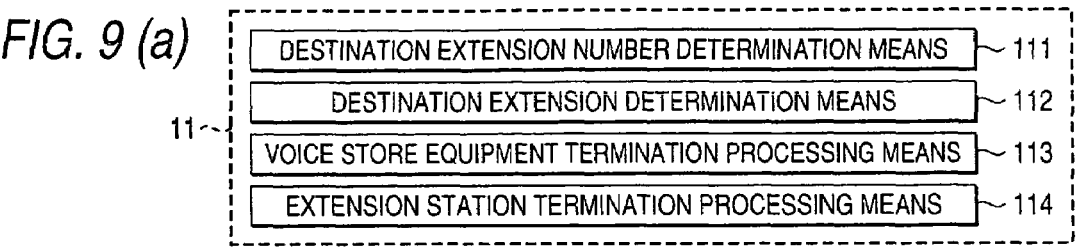
FIG. 9A A is a block diagram showing the function implementation means in the controller 11 of the PBX 1 according to Embodiment 1 of the invention.
FIG. 9B is a block diagram showing the voice store equipment termination processing means in FIG. 9A.
FIG. 9C is a block diagram showing the extension station termination processing means in FIG. 9A.
Figure 9:
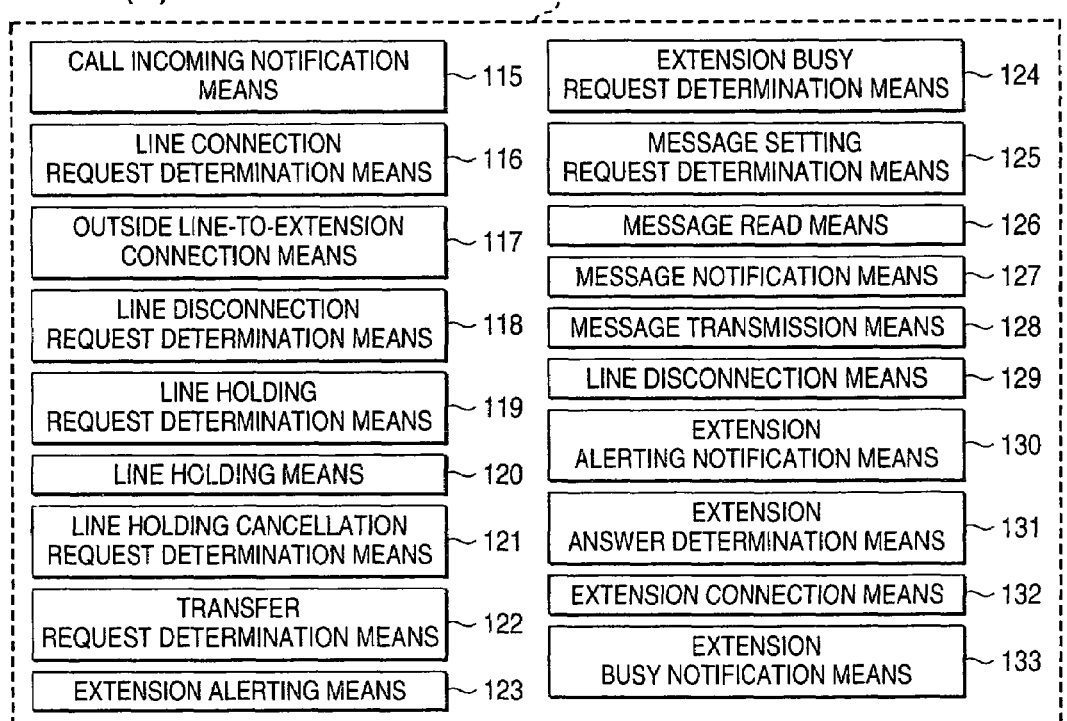
Figure 9:
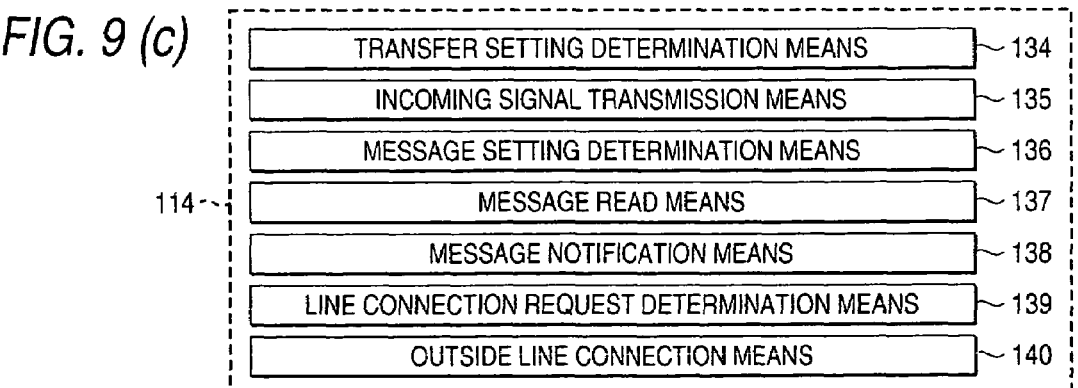

Next, operation of thus configured PBX system is described referring to FIGS. 3 through 8. FIGS. 3 through 5 are explanatory drawings showing a case where an incoming call from an outside line has terminated to the voice store equipment 2. FIGS. 6 and 7 show a case where an incoming call from an outside line has terminated to an extension. FIG. 8 is a data diagram showing the message contents and voice messages. Operation of call termination from an extension to another extension is the same as that in the related art.

Operation of a case where an incoming call from an outside line has terminated to the voice store equipment 2 is described below. As shown in FIG. 3, the voice store equipment 2 transfers an incoming call from an outside line to a specified extension (the extension station 3 in this example). Then, as shown in FIG. 4, the PBX 1 communicates to the voice store equipment 2 that the absence message "Go Home" is set to the extension station 3. Next, as shown in FIG. 5, the voice store equipment 2, receiving the notice, converts the absence message "Go Home" to the voice message "I have already left for home." on the absence message-to-voice converter 27 and adds guidance as shown in FIG. 8 to transmit the voice "This is XX. I have already left for home. Please record your message" to an outside line. The message contents are transmitted to an outside line in this way. It is thus possible to communicate correct and detailed message contents to the talker at the calling end.

Next, operation of a case where an incoming call from an outside line has terminated to an extension (the extension station 3 in this example) 2 is described below. As shown in FIG. 6, in case an incoming call from an outside line (call to be transferred to the voice store equipment 2) has terminated to the extension station 3, the call is transferred to the voice store equipment 2. Then, as shown in FIG. 7, in the transfer to the voice store equipment 2 shown in FIG. 6, the contents of the absence message at the transfer-from extension is transmitted to the voice store equipment 2 via the PBX 1. Operation of reception of the absence message is the same as that shown in FIG. 5. The message contents are transmitted to an outside line in this way. It is thus possible to communicate correct and detailed message contents to the talker at the calling end.

FIG. 9A is a block diagram showing the function implementation means (means which implements a function by way of a program) in the controller 11 of the PBX 1 according to Embodiment 1 of the invention. FIG. 9B is a block diagram showing the voice store equipment termination processing means in FIG. 9A. FIG. 9C is a block diagram showing the extension station termination processing means in FIG. 9A.

In FIG. 9A, a numeral 111 represents destination extension number determination means for determining the destination extension number for an incoming call from an outside line, 112 destination extension determination means for determining whether the destination extension is the extension station 3 (4) or voice store equipment 2 based on the destination extension number determined on the destination extension number determination means 111, 113 voice store equipment termination processing means for performing termination processing concerning the voice store equipment in case it is determined on the destination extension determination means that the destination extension is the voice store equipment 2, and 114 extension station termination processing means for performing termination processing concerning the extension station in case it is determined on the destination extension determination means that the destination extension is the extension station 3 (4).

In FIG. 9B, a numeral 113 represents voice store equipment termination processing means similar to that in FIG. 9A, 115 call incoming notification means for transmitting an incoming signal to the voice store equipment 2, 116 line connection request determination means for determining whether a connect signal from the voice store equipment 2 is received by the extension interface circuit 15 (16), 117 outside line-to-extension connection means for connecting the voice store equipment 2 to an outside line in response to a line connection request from the voice store equipment 2, 118 line disconnection request determination means for determining whether a disconnect signal from the voice store equipment 2 is received by the extension interface circuit 15 (16), and 119 line holding request determination means for determining whether a line holding signal from the voice store equipment 2 is received by the extension interface circuit 15 (16).

A numeral 120 represents line holding means for controlling the switch 12 so as to disconnect the bus interconnecting an outside line interface circuit which detected an incoming call on receiving a line holding signal and an extension interface circuit to which the voice store equipment 2 is connected, 121 line holding cancellation request determination means for determining whether a line holding cancellation signal from the voice store equipment 2 is received by the extension interface circuit 15 (16), 122 transfer request determination means for determining whether a transfer request signal from the voice store equipment 2 is received by the extension interface circuit 15 (16), and 123 extension alerting means for transmitting a call signal from an extension interface circuit corresponding to a transfer request signal to an extension station connected to the extension interface circuit.

A numeral 124 represents extension busy determination means for determining whether the transfer-to extension is busy, 125 message setting determination means for referencing the storage section 17 to determine whether the transfer-to extension has set an absence message, 126 message read means for fetching an absence message set by the transfer-to extension from an absence message assignment table 171 and an absence message table 172, 127 message notification means for transmitting the fetched absence message from the extension interface circuit to the voice store equipment 2.

A numeral 128 represents message transmission means for controlling the switch 12 to connect the voice store equipment 2 and an outside line in order to transmit a voice message corresponding to an absence message from the voice store equipment 2 to the outside line, 129 line disconnection means for controlling the switch 12 so as to disconnect the bus so as to disconnect the bus interconnecting an outside line interface circuit which detected an incoming call and an extension interface circuit to which the voice store equipment 2 is connected as well as release the connection between the outside line interface circuit and the PSTN line, 130 extension alerting notification means for notifying the voice store equipment 2 via the extension interface circuit that the transfer-to extension is ringing.

A numeral 131 represents extension answer determination means for determining whether the extension interface circuit to which the transfer-to extension is connected has received a line connection request from the transfer-to extension.

A numeral 132 represents extension connection means for controlling the switch 12 so as to connect the bus interconnecting an extension interface circuit to which the transfer-to extension station is connected and an extension interface circuit to which the voice store equipment 2 is connected, and determining that a disconnect signal from the voice store equipment 2 is received by the extension interface circuit, controlling the switch 12 so as to connect the bus interconnecting the extension interface circuit to which the transfer-to extension station is connected and an outside line interface circuit which detected an incoming signal, that is, the bus interconnecting the extension interface circuit to which the transfer-to extension station is connected and an outside line, and 133 extension busy notification means for notifying the voice store equipment 2 via the extension interface circuit that the transfer-to extension is busy.

In FIG. 9C, a numeral 114 represents extension station termination processing means similar to that in FIG. 9A, 134 transfer setting determination means for referencing the storage section 17 to determine whether setting is made on the extension station 3 (4) to transfer an incoming signal from the extension station 3 (4) to the voice store equipment 2, 135 incoming signal transmission means for transmitting an incoming signal to the voice store equipment 2 via the extension interface circuit on determining that transfer is set to the transfer setting determination means 134, and 136 message setting determination means for referencing the storage section 17 to determine whether the transfer-from extension has set an absence message.

A numeral 137 represents message read means for fetching an absence message set by the transfer-from extension from the storage section 17 when it the message setting determination means 136 determined that the absent message is set, 138 message notification means for transmitting the absence message fetched from the storage section 17 to the voice store equipment 2 via an extension interface circuit, 139 line connection request determination means for determining whether a connection request signal is received from the voice store equipment via an extension interface circuit, and 140 outside line connection means for controlling the switch 12 so as to connect the bus (channel) interconnecting an extension interface circuit which detected an incoming call and an extension interface circuit to which the voice store equipment 2 is connected.

Figure 10:
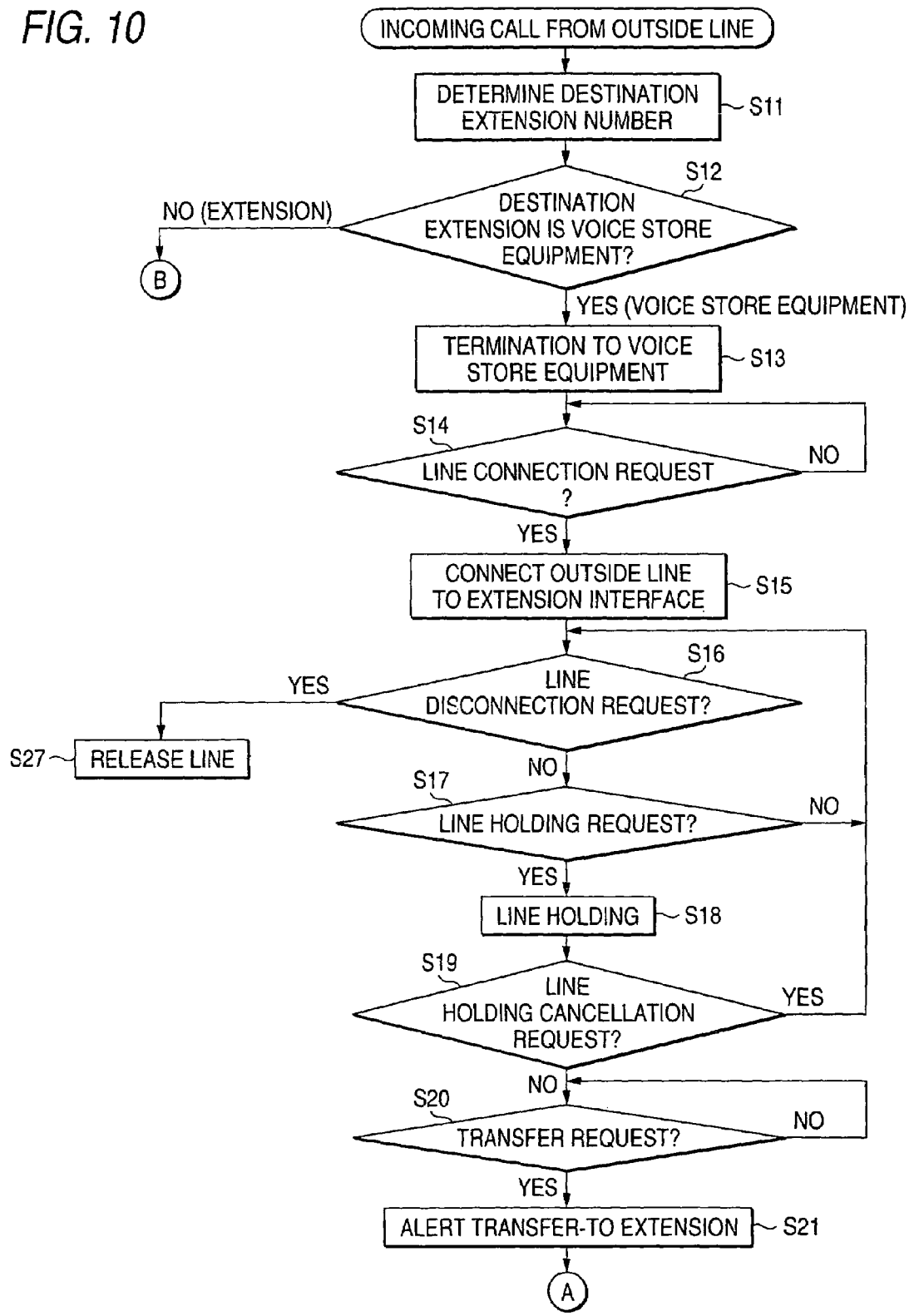
FIG. 10 is a flowchart showing the operation of the controller of the PBX.
Figure 11:
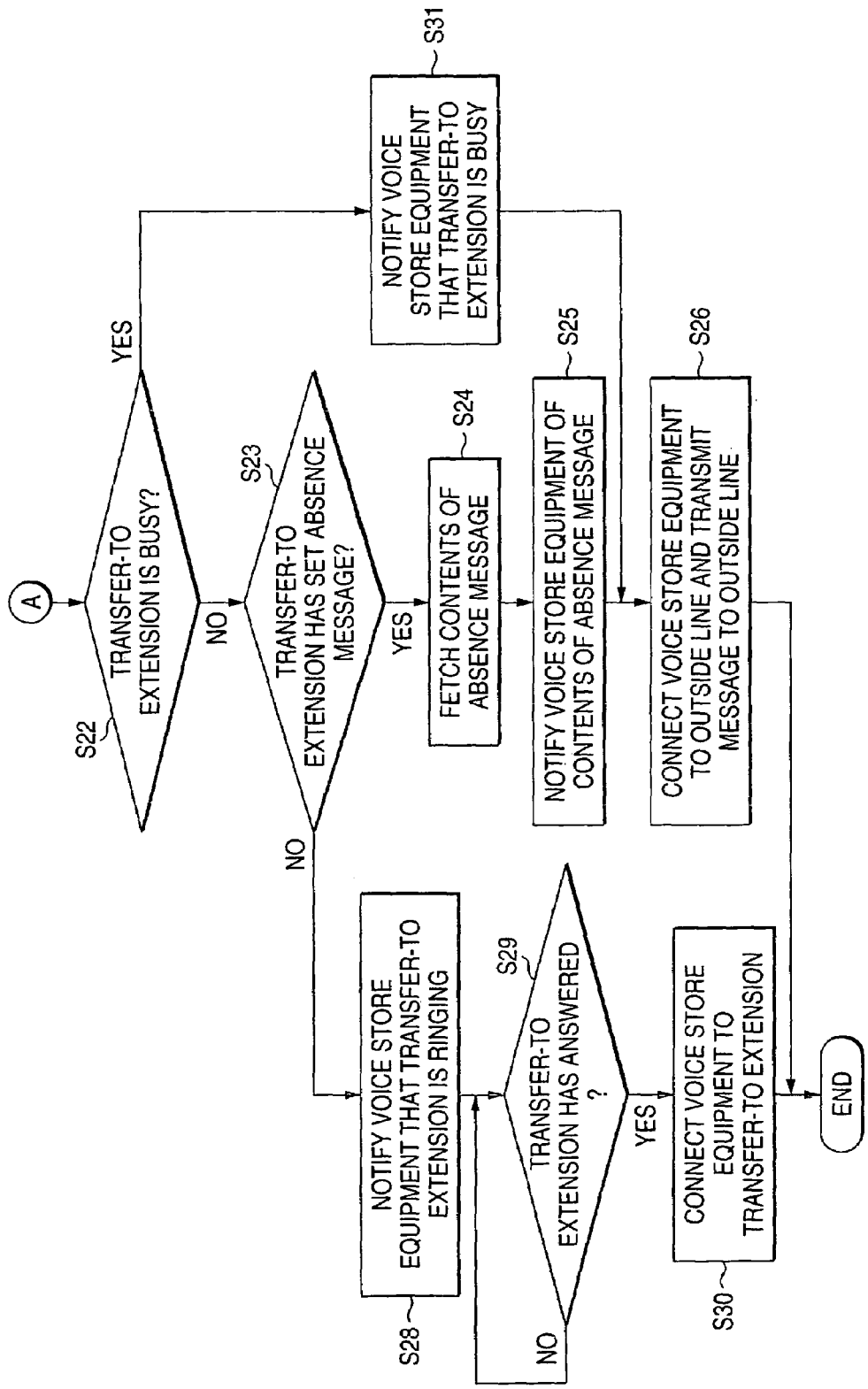
FIG. 11 is another flowchart showing the operation of the controller of the PBX.
Figure 12:
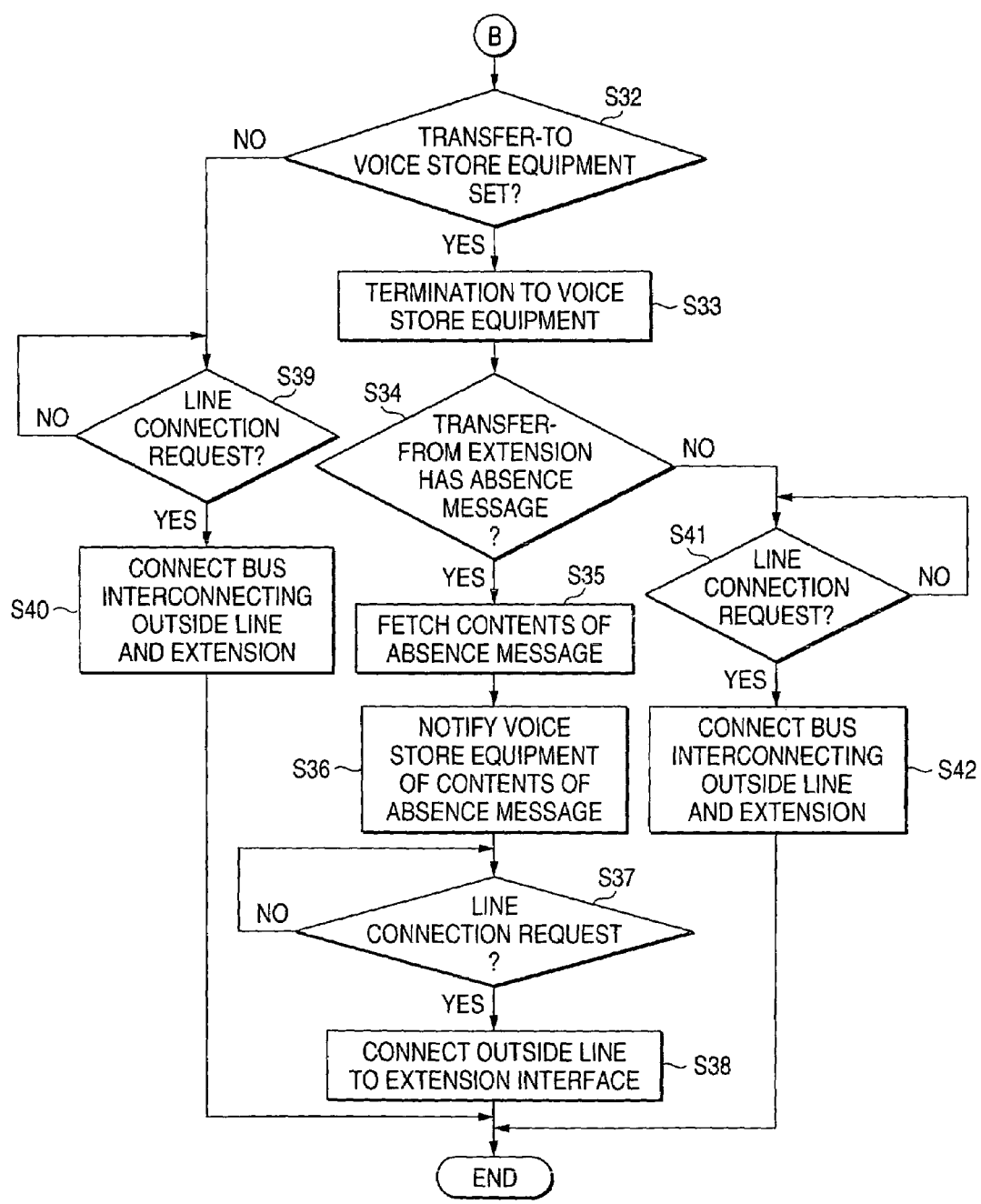
FIG. 12 is another flowchart showing the operation of the controller of the PBX.
Figure 13:
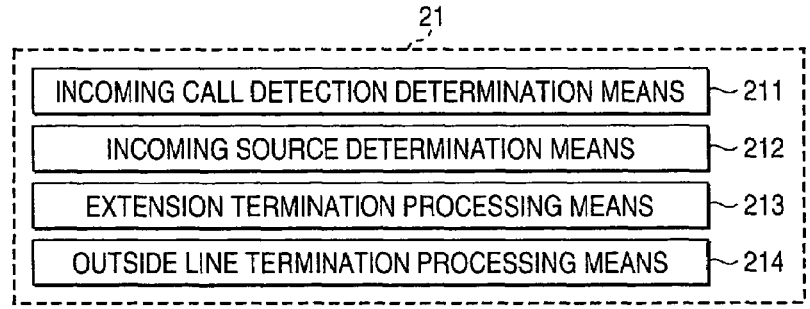
FIG. 13A is a block diagram showing the function implementation means in the controller of the voice store equipment according to Embodiment 1 of the invention.
FIG. 13B is a block diagram showing the extension termination processing means in FIG. 13A.
FIG. 13C is a block diagram showing the outside line termination processing means in FIG. 13A.
Figure 13:
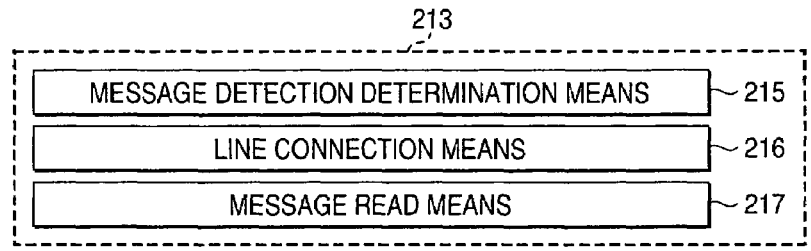
Figure 13:
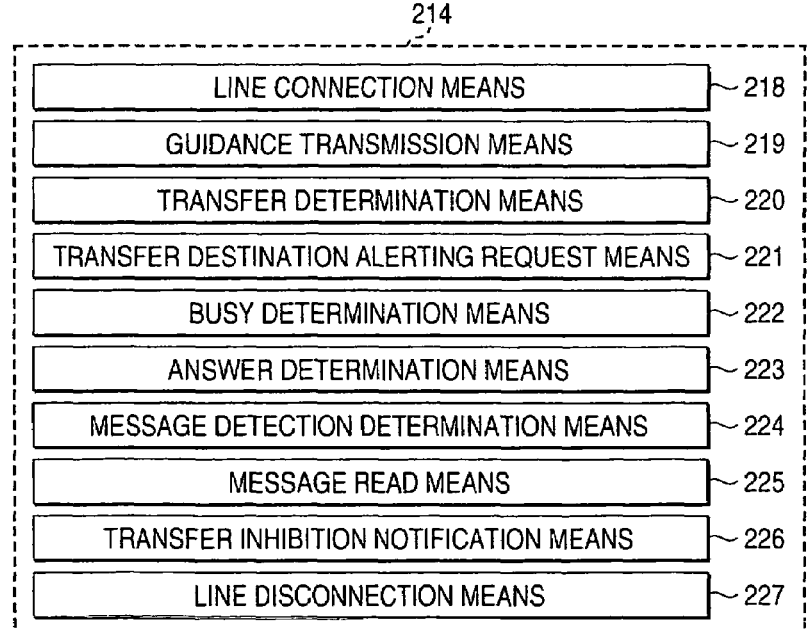

Operation of thus configured controller 11 of the PBX 1 is described below referring to FIGS. 10 through 12. FIGS. 10 through 12 are flowcharts showing the operation of the controller 11 of the PBX 1. In FIG. 10, the destination extension number determination means 111 determines the destination extension number for an incoming call from an outside line (S11). The destination extension determination means 112 determines whether the destination extension is the extension station 3 (4) or voice store equipment 2 based on the destination extension number determined on the destination extension number determination means 111 (S12). In case it is determined on the destination extension determination means 112 that the destination extension is the voice store equipment 2 in step S12, the voice store equipment termination processing means 113 performs termination processing concerning the voice store equipment 2 (S13-S31). In case it is determined on the destination extension determination means 112 that the destination extension is the extension station 3 (4) in step S12, the extension station termination processing means 114 performs termination processing concerning the extension station 3 (4) (S32-S32).

Termination processing concerning the voice store equipment 2 is described below referring to FIGS. 10 and 11. The call incoming notification means 115 transmits an incoming signal to the voice store equipment 2 (S13, call incoming notification step). Next, the line connection request determination means 116 determines whether a connect signal from the voice store equipment 2 is received by the extension interface circuit 15 (16) (S16). In case it is determined that a connect signal is received from the voice store equipment 2, the outside line-to-extension connection means 117 connects the voice store equipment 2 to an outside line (S15, outside line-to-extension connection step).

Next, the line disconnection request determination means 118 determines whether a disconnect signal from the voice store equipment 2 is received by the extension interface circuit 15 (16) (S16). In case it is determined that a disconnect signal is not received, the line holding request determination means 119 determines whether a line holding signal from the voice store equipment 2 is received by the extension interface circuit 15 (16) (S17). In case it is determined that a line holding signal is received, the line holding means 120 controls the switch 12 so as to disconnect the bus interconnecting an outside line interface circuit which detected an incoming call on receiving a line holding signal and an extension interface circuit to which the voice store equipment 2 is connected (S18).

The line holding cancellation request determination means 121 determines whether a line holding cancellation signal from the voice store equipment 2 is received by the extension interface circuit 15 (16) (S19). In case it is determined that a line holding cancellation signal is not received, the transfer request determination means 122 determines whether a transfer request signal from the voice store equipment 2 is received by the extension interface circuit 15 (16) (S20, transfer request determination step). In case it is determined that a transfer request signal from the voice store equipment 2 is received, the extension alerting means 123 transmits, via an extension interface circuit corresponding to the transfer request signal, a call signal to an extension station connected to the extension interface circuit (S21, extension alerting step).

Next, the extension busy determination means 124 determines whether the transfer-to extension is busy (S22) In case it is determined that the transfer-to extension is not busy, the message setting determination means 125 references the storage section 17 to determine whether the transfer-to extension has set an absence message (S23, message setting determination step). In case it is determined that the transfer-to extension has set an absence message, the message read means 126 fetches the absence message set by the transfer-to extension from the absence message assignment table 171 and the absence message table 172 (S24, message read step).

The message notification means 127 transmits the fetched absence message from the extension interface circuit to the voice store equipment 2 (S25, message notification step). The message transmission means 128 controls the switch 12 to connect the voice store equipment 2 and an outside line and transmits a voice message received from the voice store equipment 2 to an outside line in order to transmit a voice message corresponding to an absence message from the voice store equipment 2 to the outside line (S26, message transmission step).

In case it is determined that a disconnect signal is received in step S16, the line disconnection means 129 controls the switch 12 so as to disconnect the bus interconnecting an outside line interface circuit which detected an incoming call and an extension interface circuit to which the voice store equipment 2 is connected as well as release the connection between the outside line interface circuit and the PSTN line (S27). In case it is determined that an absence message is not set in step S23, the extension alerting notification means 130 notifies the voice store equipment 2 via the extension interface circuit that the transfer-to extension is ringing (S28).

The extension answer determination means 131 determines whether the extension interface circuit to which the transfer-to extension is connected has received a line connection request from the transfer-to extension (S29). In case it is determined that a line connection request is received from the transfer-to extension, the extension connection means 132 controls the switch 12 so as to connect the bus interconnecting an extension interface circuit to which the transfer-to extension station is connected and an extension interface circuit to which the voice store equipment 2 is connected.

The extension connection means 132, determining that a disconnect signal from the voice store equipment 2 is received by the extension interface circuit, controls the switch 12 so as to connect the bus interconnecting the extension interface circuit to which the transfer-to extension station is connected and an outside line interface circuit which detected an incoming signal, that is, the bus interconnecting the extension interface circuit to which the transfer-to extension station is connected and an outside line (S30). In case it is determined that the transfer-to extension is busy in step S22, the extension busy notification means 133 notifies the voice store equipment 2 via the extension interface circuit that the transfer-to extension is busy (S31).

Termination processing concerning the extension station 3, 4 is described below referring to FIG. 12. The transfer setting determination means 134 references the storage section 17 to determine whether setting is made on the extension station 3 (4) so as to transfer an incoming signal from the extension station 3 (4) to the voice store equipment 2 (S32, transfer setting determination step). In case it is determined that setting is made to perform transfer, the incoming signal transmission means 135 transmits an incoming signal to the voice store equipment 2 via an extension interface circuit (S33, incoming signal transmission step).

Next, the message setting determination means 136 references the storage section 17 to determine whether the transfer-from extension has set an absence message (S34, message setting determination step). In case it is determined that the transfer-from extension has set an absence message, the message read means 137 fetches the absence message set by the transfer-from extension from the storage section 17 (S35, message read step). The message notification means 138 transmits the absence message fetched from the storage section 17 to the voice store equipment 2 via an extension interface circuit (S36, absence message notification step).

The line connection request determination means 139 determines whether a connection request signal is received from the voice store equipment via an extension interface circuit (S37). In case it is determined that a connection request signal is received, the outside line connection means 140 controls the switch 12 so as to connect the bus interconnecting an extension interface circuit which detected an incoming call and an extension interface circuit to which the voice store equipment 2 is connected (S38, outside line connection step).

In case it is determined that setting is not made to transfer an incoming signal from the extension station to the voice store equipment in step S32, the line connection request determination means 139 determines whether a connection request signal is received from the voice store equipment via an extension interface circuit (S39). In case it is determined that a connection request signal is received, the outside line connection means 140 controls the switch 12 so as to connect the bus interconnecting an extension interface circuit which detected an incoming call and an extension interface circuit to which the voice store equipment 2 is connected (S40).

In case it is determined that an absence message is not set in step S34, the line connection request determination means 139 determines whether a connection request signal is received from the voice store equipment via an extension interface circuit (S41). In case it is determined that a connection request signal is received, the outside line connection means 140 controls the switch 12 so as to connect the bus interconnecting an extension interface circuit which detected an incoming call and an extension interface circuit to which the voice store equipment 2 is connected (S42).

FIG. 13A is a block diagram showing the function implementation means in the controller 21 of the voice store equipment 2 according to Embodiment 1 of the invention. FIG. 13B is a block diagram showing the extension termination processing means in FIG. 13A. FIG. 13C is a block diagram showing the outside line termination processing means in FIG. 13A.

In FIG. 13A, a numeral 211 represents incoming call detection determination means for determining whether an incoming signal from the extension interface circuit 15 (16) of the PBX 1 is detected, 212 incoming source determination means for determining whether the incoming source is an extension or an outside line from the incoming source information contained in the incoming signal received by a line interface circuit 23 (24) in case the incoming call signal from the PBX is detected by the incoming call detection determination means 211, 213 extension termination processing means for performing termination processing concerning an extension (S53-S56) incase it is determined on the incoming source determination means 212 that the incoming source is an extension, and 214 outside line termination processing means for performing termination processing concerning an outside line (S57-S66) in case it is determined on the incoming source determination means 212 that the incoming source is an outside line.

In FIG. 13B, a numeral 213 represents extension termination processing means similar to that in FIG. 13A, 215 message detection determination means for determining whether an absence message contained in the incoming signal received from a calling extension is detected, 216 line connection means for controlling the line interface circuit so as to connect the extension interface circuit 15 (16) of the PBX 1 and the line interface circuit 23 (24) in case an absence message is detected on the message detection determination means 215, 217 message read means for controlling the switch 22 so as to connect the bus interconnecting the line interface circuit and a message storage section 25 as well as reading a voice message corresponding to the detected absence message from the message storage section 25 and transmitting the read voice message to the extension interface circuit of the PBX 1.

In FIG. 13C, a numeral 214 represents outside line termination processing means similar to that in FIG. 13A, 218 line connection means for controlling the line interface circuit so as to connect the extension interface circuit 15 (16) of the PBX 1 and the line interface circuit 23 (24) (in this example establish connection to an outside line), and 219 guidance transmission means for controlling the switch 22 so as to connect the bus interconnecting the line interface circuit and a guidance storage section 26 as well as reading guidance from the guidance storage section 26.

A numeral 220 represents transfer determination means for determining whether a transfer instruction is detected from the incoming signal received by the line interface circuit, 221 transfer destination alerting request means for requesting the line interface circuit to transmit a holding request signal and an transfer-to extension number to the extension interface circuit, or alerting the transfer-to extension, on determining that a transfer instruction is detected on the transfer determination means 220, and 222 busy determination means for determining whether the line interface circuit has received from an extension interface circuit a signal indicating that the transfer-to extension is busy.

A numeral 223 represents answer determination means for determining whether the line interface circuit has received a signal indicating that the transfer-to extension has answered or an absence message is set to the transfer-to extension (answer signal) from the extension interface circuit, and 224 message detection determination means for determining whether the line interface circuit has received an absence message from the extension interface circuit, that is, whether the line interface circuit has detected an absence message from the received answer signal.

A numeral 225 represents message read means for controlling the line interface circuit so as to transmit a holding cancellation signal to an extension interface circuit and controlling the switch 22 so as to connect the bus interconnecting the line interface circuit and the message storage section 25 as well as reading a voice message corresponding to the detected absence message from the message storage section 25 and transmitting the read voice message to the extension interface circuit of the PBX 1.

A numeral 226 represents transfer inhibition notification means for transmitting a holding cancellation signal to an extension interface circuit and controlling the switch 22 so as to connect the bus interconnecting the message storage section 25 and a line interface circuit as well as reading a voice message indicating that transfer is inhibited from the message storage section 25 and transmitting the voice message to the extension interface circuit of the PBX 1, that is, to an outside line, and 227 line disconnection means for controlling the line interface circuit so as to transmit a disconnect signal to an extension interface circuit.

Figure 14:
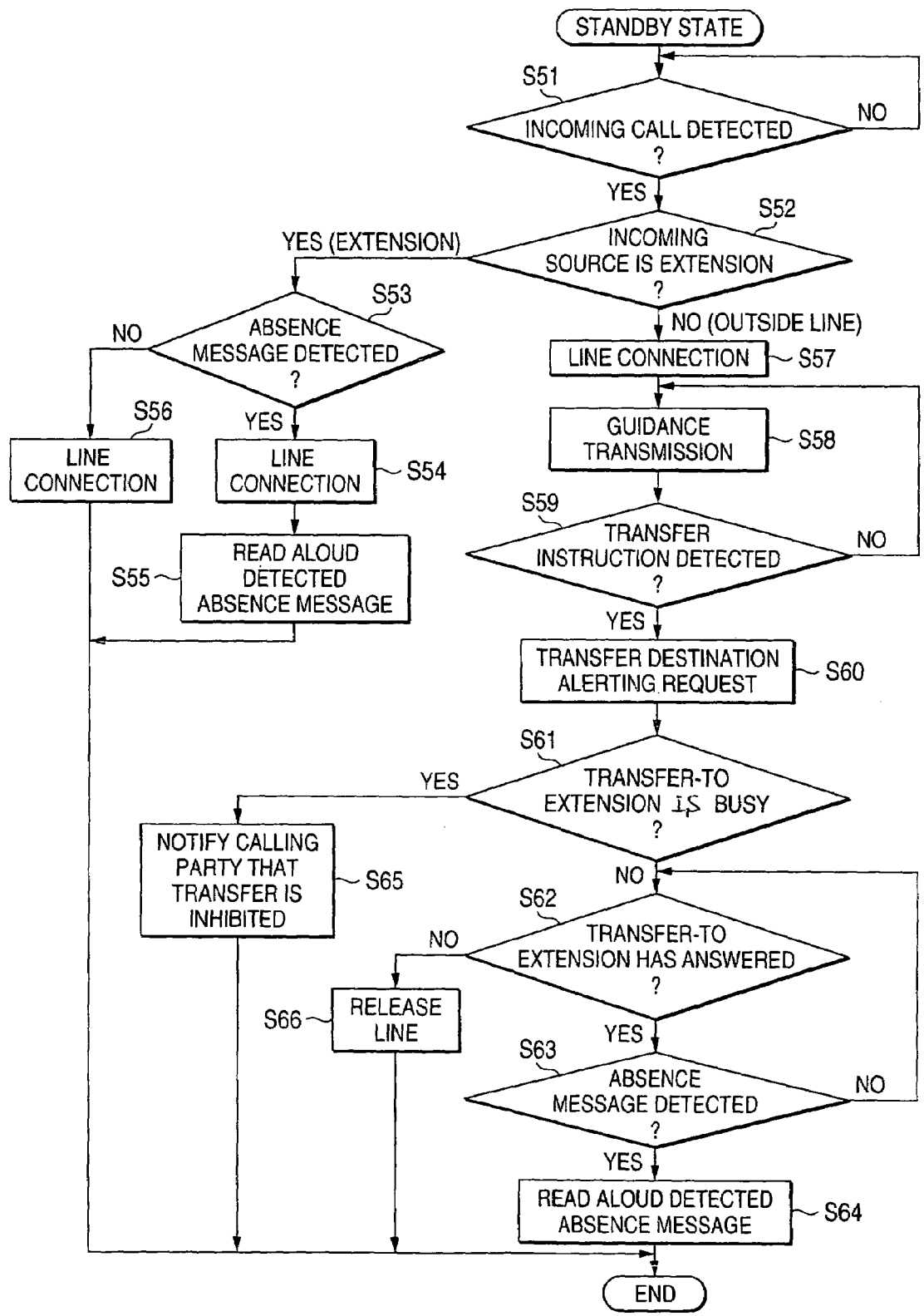
FIG. 14 is a flowchart showing the operation of the controller of the voice store equipment shown in FIG. 13.
Figure 15:
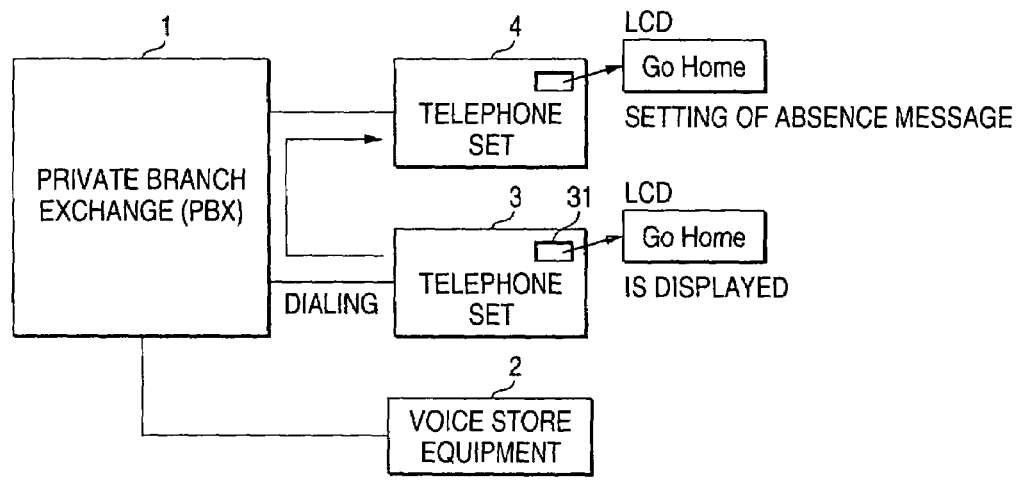
FIG. 15 is an operation explanatory drawing of the operation of in related art PBX and voice store equipment.
Figure 16:
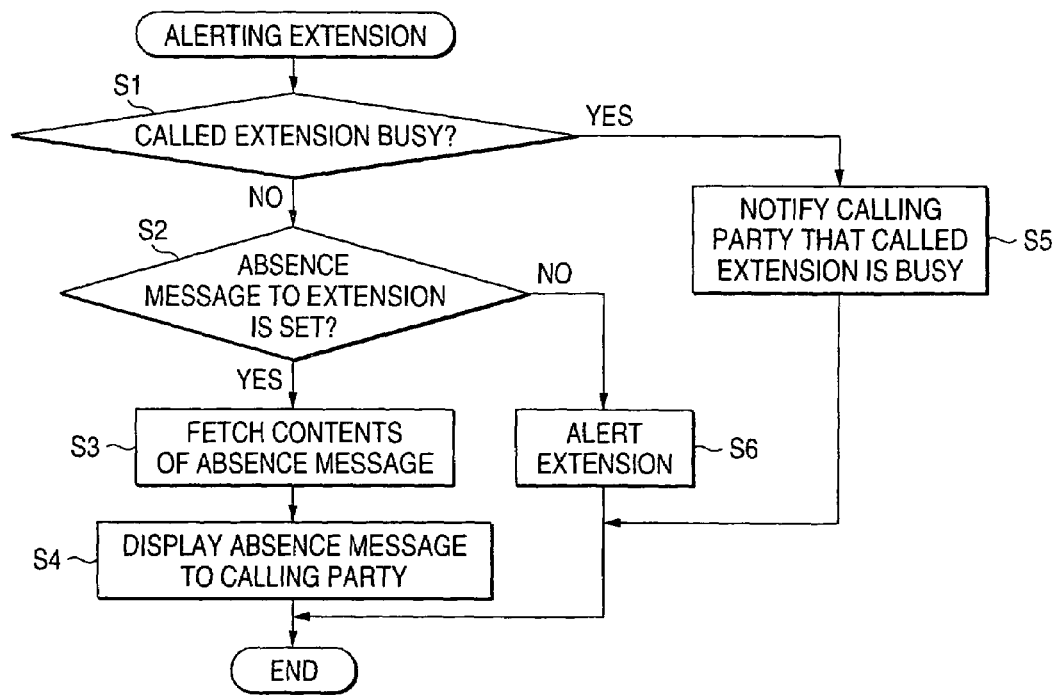
FIG. 16 is a flowchart showing

Operation of thus configured voice store equipment 2 is described below referring to FIG. 14. FIG. 14 is a flowchart showing the operation of the controller 21 of the voice store equipment 2 shown in FIG. 13. In FIG. 14, the incoming call detection determination means 211 determines whether an incoming signal from the extension interface circuit 15 (16) of the PBX 1 is detected (S51, incoming call detection determination step). In case it is determined that an incoming signal is detected, the incoming source determination means 212 determines whether the incoming source is an extension or an outside line from the incoming source information contained in the incoming signal received by the line interface circuit 23 (24) (S52, incoming source determination step). In case it is determined that the incoming source is an extension, the extension termination processing means 213 performs termination processing concerning an extension (S53-S56). In case it is determined on the incoming source determination means 212 that the incoming source is an outside line, the outside line termination processing means 214 performs termination processing concerning an outside line (S57-S66).

In case it is determined that the incoming source is an extension, the message detection determination means 215 determines whether an absence message contained in the incoming signal received from the calling extension is detected (S53, message detection determination step). In case it is determined that an absence message is detected, the line connection means 216 controls the line interface circuit 23 (24) so as to connect the extension interface circuit 15 (16) of the PBX 1 and the line interface circuit 23 (24) (S54, line connection step).

Next, the message read means 217 controls the switch 22 so as to connect the bus interconnecting the line interface circuit and the message storage section 25 as well as reads a voice message corresponding to the detected absence message from the message storage section 25 and transmitting the read voice message to the extension interface circuit of the PBX 1 (S55, message read step). In case it is determined that an absence message is not detected in step S53, the line connection means 216 controls the line interface circuit 23 (24) so as to connect the extension interface circuit 15 (16) of the PBX 1 and the line interface circuit 23 (24), that is, to transmit guidance to an outside line (S56, line connection step).

In case it is determined that the incoming source is an outside line in step S52, the line connection means 218 controls the line interface circuit so as to connect the extension interface circuit 15 (16) of the PBX 1 and the line interface circuit 23 (24) (in this example establish connection to an outside line) (S57, line connection step). Next, the guidance transmission means 219 controls the switch 22 so as to connect the bus interconnecting the line interface circuit and a guidance storage section 26 as well as reads guidance from the guidance storage section 26 (S58, guidance transmission step).

The transfer determination means 220 determines whether a transfer instruction is detected from the incoming signal received by the line interface circuit (S59, transfer determination step). In case it is determined that a transfer instruction is detected, the transfer destination alerting request means 221 requests the line interface circuit to transmit a holding request signal and an transfer-to extension number to the extension interface circuit, or alerts the transfer-to extension (S60, transfer destination alerting request step).

Next, the busy determination means 222 determines whether the line interface circuit has received from an extension interface circuit a signal indicating that the transfer-to extension is busy (S61). In case its is determined that a signal indicating that the transfer-to extension is busy is not received, the answer determination means 223 determines whether the line interface circuit has received a signal indicating that the transfer-to extension has answered or an absence message is set to the transfer-to extension (answer signal) from the extension interface circuit (S62).

In case it is determined that an answer signal is received, the message detection determination means 224 determines whether the line interface circuit has received an absence message from the extension interface circuit, that is, whether the line interface circuit has detected an absence message from the received answer signal (S63, message detection determination step). In case it is determined that an absence message is detected from the answer signal, the message read means 225 controls the line interface circuit so as to transmit a holding cancellation signal to an extension interface circuit and controls the switch 22 so as to connect the bus interconnecting the line interface circuit and the message storage section 25 as well as reads a voice message corresponding to the detected absence message from the message storage section 25 and transmits the read voice message to the extension interface circuit of the PBX 1 (S64, message read step).

In case it is determined that a signal indicating that the transfer-to extension is busy is received in step S61, the transfer inhibition notification means 226 transmits a holding cancellation signal to an extension interface circuit and controls the switch 22 so as to connect the bus interconnecting the message storage section 25 and a line interface circuit as well as reads a voice message indicating that transfer is inhibited from the message storage section 25 and transmits the voice message to the extension interface circuit of the PBX 1, that is, to an outside line (S65). In case it is determined that an answer signal is not received in step S62, the line disconnection means 227 controls the line interface circuit so as to transmit a disconnect signal to an extension interface circuit (S66).

According to this embodiment, the controller 11 comprises: destination extension number determination means 111 for determining the destination extension number for an incoming call from the outside line; destination extension determination means 112 for determining whether the destination extension is the extension station 3, 4 or the voice store equipment 2 based on the determined destination extension number; voice store equipment termination processing means 113 for performing termination processing concerning the voice store equipment in case it is determined on the destination extension determination means 112 that the destination extension is the voice store equipment 2; and extension station termination processing means 114 for performing termination processing concerning the extension station in case it is determined on the destination extension determination means 112 that the destination extension is the extension station. This makes it possible to determine whether the destination extension is voice store equipment or an extension and appropriately process an absence message set to an extension station depending on an incoming call to the voice store equipment or extension station. As a result, it is possible to efficiently utilize an absence message set to an extension station in response to an incoming call from an outside line. While an incoming call from an outside line is described hereinabove, an incoming call from an extension is processed the same way. In this case, a destination extension number is specified to an incoming call from an extension so that the destination extension number determination means or destination extension determination means discussed above is not used.

The voice store equipment termination processing means 113 comprises: call incoming notification means 115 for transmitting an incoming signal to the voice store equipment; outside line-to-extension connection means 117 for connecting the voice store equipment to an outside line in response to a line connection request from the voice store equipment; transfer request determination means 122 for determining whether a transfer request signal is received from the voice store equipment; extension alerting means 123 for alerting a transfer-requested extension station in case it is determined that a transfer request is determined by the transfer request determination means 122; message setting determination means 125 for determining whether the transfer-requested extension has set an absence message; message read means 126 for fetching an absence message from an extension station in case it is determined that an absence message is set on the message setting determination means 125; message notification means 127 for communicating the absence message fetched from the extension station to the voice store equipment; and message transmission means 128 for connecting the voice store equipment and the outside line in order to transmit a voice message corresponding to the absence message from the voice store equipment 2 to the outside line. In case the destination extension is voice store equipment and an absence message is set to an extension station, the absence message is fetched from the extension station and communicated to the voice store equipment, and a voice message corresponding to the communicated absence message is transmitted to an outside line. It is thus possible to efficiently utilize an absence message set to an extension station in response to an incoming call from an outside line.

The voice store equipment termination processing means 113 further comprises extension connection means 132 for releasing the connection between the voice store equipment and the transfer-requested extension station and connecting the transfer-requested extension station and an outside line in case it is determined that an absence message is not set on the message setting determination means 125. An extension station and an outside line are interconnected as an ordinary procedure in case an absence message is not detected and a call is normally established.

Further, the extension station termination processing means 114 comprises: transfer setting determination means 134 for referencing a storage section to determine whether transfer to the voice store equipment is set to the destination extension station; incoming signal transmission means for transmitting an incoming call to the voice store equipment in case the transfer setting determination means has determined that the transfer is set; message setting determination means 136 for referencing the storage section 17 to determine whether an absence message is set to the destination extension station; message read means 137 for fetching an absence message from the storage section 17 in case the message setting determination means 136 has determined that an absence message is set; message notification means 138 for communicating the absence message fetched from the storage section 17 to the voice store equipment; and outside line connection means 140 for connecting the voice store equipment and an outside line in order to transmit a voice message corresponding to the communicated absence message from the voice store equipment 2 to an outside line in response to a line connection request from the voice store equipment. In case the destination extension is an extension station and an absence message is set to the extension station, the absence message is fetched from the extension station and communicated to the voice store equipment, and a voice message corresponding to the communicated absence message is transmitted to an outside line. It is thus possible to efficiently utilize an absence message set to an extension station in response to an incoming call from an outside line.

The controller 21 further comprises: incoming call detection determination means 211 for determining whether an incoming signal from the PBX 1 is detected; incoming source determination means 212 for determining whether the incoming source is an extension or an outside line in case the incoming call signal is detected by the incoming call detection determination means 211; extension termination processing means 213 for performing termination processing concerning an extension in case it is determined on the incoming source determination means 212 that the incoming source is an extension; and outside line termination processing means 214 for performing termination processing concerning an outside line in case it is determined on the incoming source determination means 212 that the incoming source is an outside line. It is thus possible to determine whether the incoming source is an extension or an outside line. When it is determined that the incoming source is an extension, termination processing concerning an extension is performed. When it is determined that the incoming source is an outside line, termination processing concerning an outside line is performed. It is thus possible to appropriately process an absence message set to an extension station in the voice store equipment connected to the PBX. It is thus possible to efficiently utilize an absence message set to an extension station in response to an incoming call from an outside line.

The extension termination processing means 213 comprises: message detection determination means 215 for determining whether an absence message contained in an incoming signal is detected; line connection means 216 for connecting to the PBX via a line interface circuit in case it is determined on the message detection determination means 215 that an absence message is detected; and message read means 217 for reading a voice message corresponding to the detected absence message and transmitting the read voice message to the PBX. In case the incoming source is an extension and an absence message is set to an extension station, the absence message contained in an incoming signal is detected and a voice message corresponding to the detected absence message is transmitted to an outside line. It is thus possible to efficiently utilize an absence message set to an extension station in response to an incoming call from an outside line via an extension.

The outside line termination processing means 214 comprises: line connection means 218 for connecting to an outside line; guidance transmission means 219 for transmitting guidance; transfer determination means 220 for determining whether a transfer instruction is detected from an incoming signal; transfer destination alerting request means 221 for alerting the transfer-to extension on determining that a transfer instruction is detected on the transfer determination means 220; message detection determination means 224 for determining whether an absence message is detected from an answer signal in case the alerted transfer-to extension is not busy and an answer signal is received from the alerted transfer-to extension; and message read means 225 for reading a voice message corresponding to a detected absence message and transmitting the read voice message to the PBX in case the absence message is detected on the message detection determination means 224. In case the incoming source is an outside line and an absence message is set to an extension station, the absence message contained in an answer signal from the extension station is detected and a voice message corresponding to the detected absence message is transmitted to an outside line. It is thus possible to efficiently utilize an absence message set to an extension station in response to an incoming call directly from an outside line.

According to the present invention, in case the destination extension is voice store equipment and an absence message is set to an extension station, the absence message is fetched from the extension station and the fetched absence message is communicated to the voice store equipment and a voice message corresponding to the communicated absence message is transmitted to an outside line. It is thus possible to efficiently utilize an absence message set to an extension station in response to an incoming call from an outside line.

Further, according to the invention, in case the destination extension is an extension and an absence message is set to an extension station, the absence message is fetched from the extension station and the fetched absence message is communicated to the voice store equipment and a voice message corresponding to the communicated absence message is transmitted to an outside line. It is thus possible to efficiently utilize an absence message set to an extension station in response to an incoming call from an outside line.

The present disclosure relates to subject-matter contained in priority Japanese Patent Application Nos. 2003-120005 filed on Apr. 24, 2003 and 2004-30340 filed on Feb. 6, 2004, the contents of which are herein expressly incorporated by reference in its entirety.

What is claimed is:

1. A communication system, comprising:
 a plurality of extension stations;
 a voice store equipment; and
 a private branch exchange which accommodates the plurality of extension stations and the voice store equipment,
 the extension station including:
  an input unit through which text data is set to the extension station; and
  a display unit that displays the text data as an absence message, the voice store equipment including:
   an interface circuit for connecting to the private branch exchange;
   a Voice Storage Equipment switch that controls connection of the interface circuit to the private branch exchange; and
   a message storage section that stores a voice message which corresponds to the text data, the voice message being voice data to which the text data is converted; and
   a Voice Storage Equipment controller that controls the entire voice store equipment, the private branch exchange including:
    an outside line interface circuit for connecting to an outside line;
    an extension interface circuit for connecting to an extension;
    a PBX switch that controls connection of an incoming call;
    an absence message table that stores the text data set to the extension station; and
    a PBX controller that controls connection between the outside line and either the extension or the voice store equipment,
 wherein if the extension station receives an incoming signal from the outside line, the PBX controller transfers, to the voice store equipment, both the incoming signal and the text data stored in the absence message table,
 wherein if the voice store equipment receives both the incoming signal and the text data through the interface circuit, the Voice Storage Equipment controller reads, from the message storage section, the voice message corresponding to the received text data and transmits the voice message to the private branch exchange using the Voice Storage Equipment switch, and
 wherein the PBX controller transmits the voice message to the outside line using the PBX switch.

2. The communication system according to claim 1,
 wherein the voice store equipment further includes a guidance section that store guidance data, and
 wherein the Voice Storage Equipment controller adds, to the voice message read from the message storage section, the guidance data stored in the guidance section and transmits the voice message with the guidance data to the private branch exchange.

3. The communication system according to claim 1,
 wherein the private branch exchange further includes an absence message assign table that stores an assignment data, the assignment data showing assignment status of the absence message,
 wherein the voice store equipment further includes a voice converter that convert the text data into the voice data of the voice message, and
 wherein if the text data is set as the absence message through the input unit, the absence message assign table stores the assignment data and the PBX controller sets transmission of the incoming signal to the voice converter.

4. The communication system according to claim 3,
 wherein the voice store equipment further includes a guidance section that store guidance data, and
 wherein the Voice Storage Equipment controller adds, to the voice message read from the message storage section, the guidance data stored in the guidance section and transmits the voice message with the guidance data to the private branch exchange.

5. The communication system according to claim 1, wherein numerical data is set to the extension station through the input unit.

* * * * *